(Specimens.)
M. W. PARRISH.
PROCESS OF SEPARATING METALLIC IMPURITIES FROM GRAPHITE.
No. 429,386. Patented June 3, 1890.
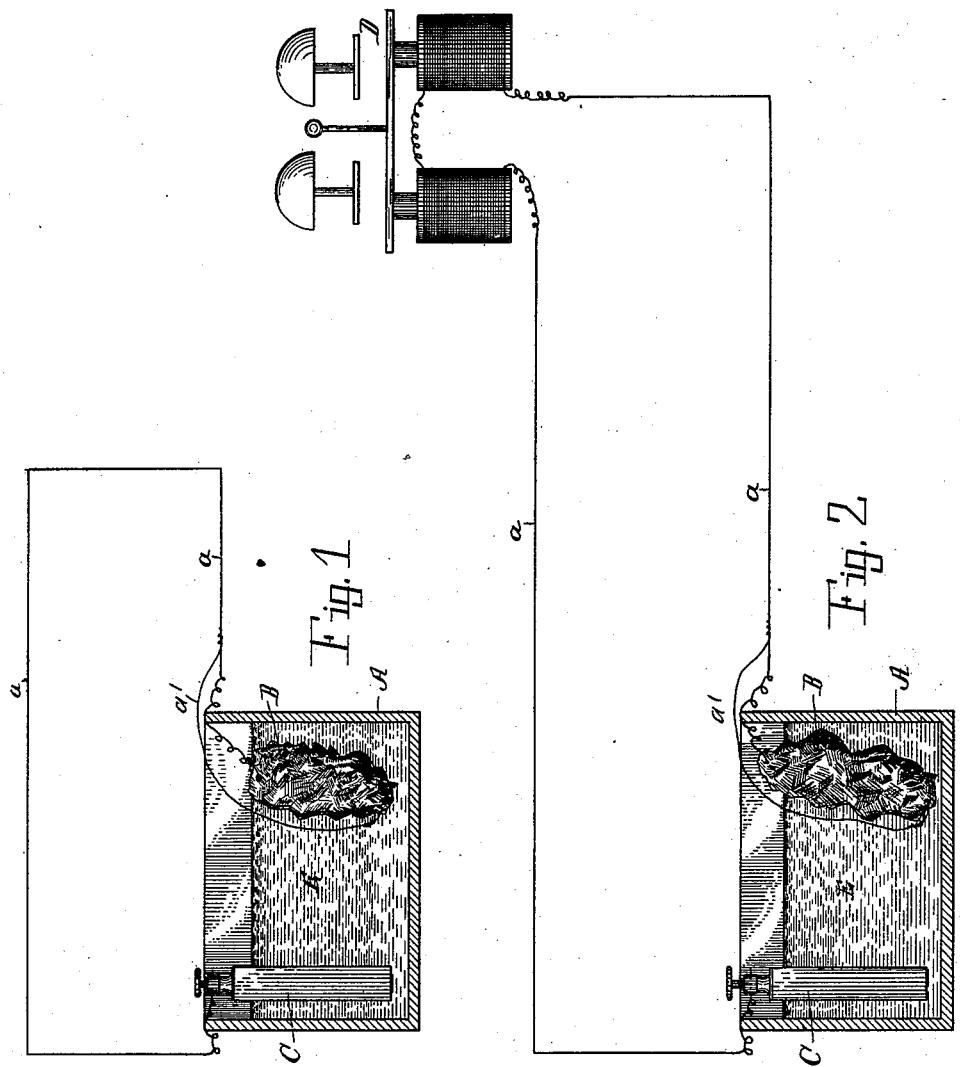
Witnesses:
Walter S. Wood
Walter English
Inventor.
Myron W. Parrish
By Lucius C. West
Atty

United States Patent Office.

MYRON W. PARRISH, OF DETROIT, MICHIGAN, ASSIGNOR TO THE GRAPHITE ELECTRIC COMPANY, OF SAME PLACE, AND JOHN HUTCHINSON, OF JACKSON, MICHIGAN.

PROCESS OF SEPARATING METALLIC IMPURITIES FROM GRAPHITE.

SPECIFICATION forming part of Letters Patent No. 429,386, dated June 3, 1890.

Application filed December 2, 1889. Serial No. 332,234. (Specimens.)

*To all whom it may concern:*

Be it known that I, MYRON W. PARRISH, a citizen of the United States, residing at Detroit, county of Wayne, State of Michigan, have invented a new and useful Method of Subtracting the Metal Elements from Graphite, of which the following is a specification.

The object of this invention is to subtract the iron or other metal elements from graphite by electricity.

I have discovered that I can subtract the metal elements from graphite by employing the graphite in an electric battery in lieu of the ordinary carbon stick and using common salt and water as the solution in the battery. Common moist salt may be employed, or any other elements suitable; but I find the best results are attained from water and common salt. I also find that the desired result is produced in less time by passing the electric current directly through the graphite.

In the drawings forming a part of this specification, Figure 1 is a sectional elevation of the battery and showing the circuit-wires, and Fig. 2 is the same with armature in said circuit.

Referring to the lettered parts of the drawings, A is the jar or vessel containing the common salt and water E. The zinc element is shown at C and the graphite at B in its crude state, as when taken from the mines. The prevailing metal element in the crude graphite when taken from the mines is iron, although it may contain other metals of which it is desired to free the graphite. At $a\,a$ are the circuit-wires.

The circuit may be closed, as in Fig. 1, or there may be an armature in the circuit, which the signal-bell D will serve to illustrate. The latter plan is preferable, because the metal is subtracted or consumed in less time when the current is disturbed. As the graphite is a conductor of the electric current, I am enabled to pass the current through the graphite by attaching one end of the wire $a'$ to one end of said graphite and attaching the other end of the said wire to the circuit-wire $a$, as shown in the drawings.

Any number of pieces of graphite may be treated at once by connecting each with the other by wires, and, in fact, it is the design to thus treat several pieces of the graphite at a time for the purpose of subtracting the metal elements from them preparatory to their being pulverized and manufactured into marketable carbon. When the graphite is thus freed of the metal, it is in somewhat of a porous condition, and can be treated at a much less expense by the manufacturers of carbon.

Having thus described my invention, what I claim as new, and desire to secure by Letters Patent of the United States, is—

The process of subtracting the metal element from crude graphite, which process consists in employing the graphite as one of the electrodes of a battery, connecting said graphite with circuit-wires in a manner to pass the current of electricity through the graphite, and immersing the graphite in the solution of the battery, substantially as set forth.

In testimony of the foregoing I have hereunto subscribed my name in presence of two witnesses.

MYRON W. PARRISH.

Witnesses:
HOMER A. PARRISH,
BELLE FREEMAN.